US007831970B2

(12) United States Patent
Moore

(10) Patent No.: US 7,831,970 B2
(45) Date of Patent: Nov. 9, 2010

(54) METHOD AND APPARATUS FOR SCHEDULING PERIODIC TASKS BASED ON SYNTHETIC HOMOGENIZATION

(75) Inventor: Sean S. B. Moore, Hollis, NH (US)

(73) Assignee: Avaya Inc., Basking Ridge, NJ (US)

( * ) Notice: Subject to any disclaimer, the term of this patent is extended or adjusted under 35 U.S.C. 154(b) by 1532 days.

(21) Appl. No.: 11/171,631

(22) Filed: Jun. 30, 2005

(65) Prior Publication Data

US 2007/0006229 A1    Jan. 4, 2007

(51) Int. Cl.
 *G06F 9/46* (2006.01)
(52) U.S. Cl. ...................................... 718/102
(58) Field of Classification Search .................. 718/102
 See application file for complete search history.

(56) References Cited

U.S. PATENT DOCUMENTS

| 5,274,635 | A | * | 12/1993 | Rahman et al. | 370/352 |
| 5,745,778 | A | * | 4/1998 | Alfieri | 712/1 |
| 5,926,459 | A | * | 7/1999 | Lyles et al. | 370/230 |
| 6,009,409 | A | * | 12/1999 | Adler et al. | 705/14.61 |
| 6,134,596 | A | * | 10/2000 | Bolosky et al. | 709/233 |
| 6,711,607 | B1 | * | 3/2004 | Goyal | 709/203 |
| 7,165,257 | B2 | * | 1/2007 | Musoll et al. | 718/108 |
| 7,353,294 | B1 | * | 4/2008 | Nucci et al. | 709/241 |
| 2006/0288346 | A1 | * | 12/2006 | Santos et al. | 718/102 |

OTHER PUBLICATIONS

Moore, Justin, et al, "Making Scheduling 'Cool': Temperature-Aware Workload Placement in Data Centers", 2005 USENIX Annual Technical Conference, Apr. 13, 2005.*

* cited by examiner

*Primary Examiner*—Meng-Ai An
*Assistant Examiner*—Gregory A Kessler
(74) *Attorney, Agent, or Firm*—Joseph B. Ryan; Jason Paul DeMont; Wayne S. Breyer

(57) ABSTRACT

Methods and systems are disclosed for scheduling one or more tasks to be performed by a resource modeled as a mathematical group. One or more tasks to be performed by a resource modeled as a mathematical group are scheduled by selecting a coset representative k of a subgroup of the mathematical group based on predefined criteria for homogenization of the one or more tasks. The one or more tasks may comprise, for example, packets and the resource may be, for example, one or more communications links in a packet network. The predefined criteria for homogenization of the one or more tasks includes, for example, a time-based or a size-based homogenization of the tasks (or both).

36 Claims, 2 Drawing Sheets

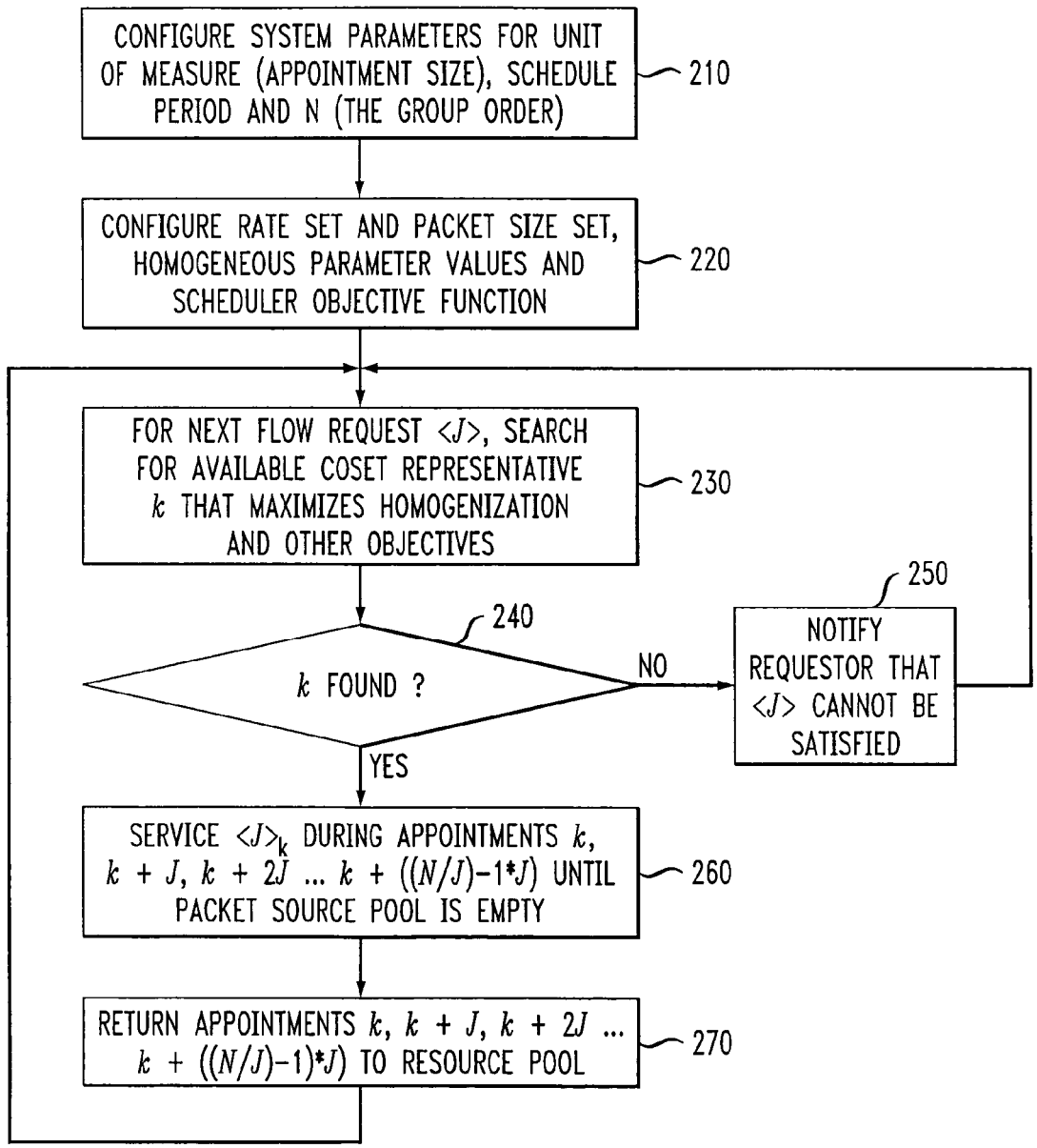

METHOD AND APPARATUS FOR SCHEDULING PERIODIC TASKS BASED ON SYNTHETIC HOMOGENIZATION

CROSS-REFERENCE TO RELATED APPLICATIONS

The present application is related to U.S. Pat. application Ser. No. 10/814,604, entitled "System and Method for Efficient Scheduling of Periodic Phenomena," filed Mar. 31, 2004 and incorporated by reference herein.

FIELD OF THE INVENTION

The present invention relates generally to methods and systems that schedule periodic tasks, such as packet transmissions in a packet-switched network, and more particularly, to methods and systems for scheduling resources, such as communications links, to service the periodic tasks.

BACKGROUND OF THE INVENTION

The protocols used at the various logical levels of the network partially determine the treatment that packets receive as they traverse the network. For example, at the logical level in the network defined as the internetworking layer by the ISO Open Systems Interconnect model, a popular protocol is the Internet Protocol, commonly referred to as IP. IP serves to ensure interoperation between networks that use different protocols at the lower logical layers and has become hugely successful, as evidenced by the global Internet. IP-based networks were originally designed to provide "best-effort" service, in which all packets receive similar transport treatment, and to provide a connectionless architecture that uses transport-layer protocols, such as TCP (Transmission Control Protocol), to ensure that network resources are shared fairly among all the packet flows.

Best-effort service makes no performance guarantees as to the transport time of packets (delay) or the throughput between hosts, nor does IP guarantee that packets will arrive at their destinations, as the IP protocol permits switches and routers to discard, or drop, packets if the packet queues servicing the communications links become full. Many popular applications, e.g., file transfer and e-mail, typically do not have strict requirements on transport delay and throughput, and such applications and their associated packet flows are commonly referred to as elastic applications and elastic flows, respectively, because they can tolerate variances in delay and throughput. Often, however, these applications cannot tolerate packet loss, so higher-level transport protocols such as TCP are used to detect and retransmit dropped packets and to control the packet throughput such that congestion and packet-drop probabilities are reduced.

The technological successes of IP networking, as well as compelling business and financial factors, have sourced a migration of many other applications from non-IP networks to IP networks, a phenomenon called convergence. Many of these migrating applications, such as voice and video teleconferencing, are inelastic, i.e., they have strict requirements on the transport performance, or Quality-of-Service (QoS), provided by the network, with respect to delay, packet loss probabilities, and throughput that must be met, but that may not be met because of the lack of guarantees provided by a best-effort service. Differentiated services are needed to augment best-effort service, but in a converged environment mixing elastic and inelastic applications on a shared IP infrastructure and providing differentiated services for different classes of traffic with different QoS performance needs has proven to be difficult, for several reasons.

One of the primary reasons is that conventional IP networking results in stochastic packet transport processes, and furthermore in a class of stochastic processes commonly referred to as "bursty." Analysis methods for bursty processes are complex and not as well understood as some other common stochastic processes, such as Poisson processes, observed in some non-IP networks. The pragmatic side effect of bursty processes is that it is difficult for designers and operators of IP networks to efficiently allocate networking resources to support differentiated services, e.g., to select packet buffer sizes in switches and routers that will meet delay and drop probability requirements, or to select links with sufficient capacities to handle anticipated traffic loads while maintaining required QoS performance metrics.

A simple and often-used approach to overcoming the difficulties is to overprovision the links, switches, and routers, i.e., purchase more-than-sufficient link capacity, and purchase switches and routers with sufficient processing power, non-blocking architectures, and buffer resources to drive packets through the links at the line rate and with low packet drop probability. Often, Moore's Law makes switch/router overprovisioning economically feasible. In some cases, e.g., wired Local Area Networks (LANs), such as 1G or 10G Ethernet LANs, it is also economically feasible to overprovision communications links. For wide-area network (WAN) interconnection and access links, however, overprovisioning is often not economically feasible and possibly not available from interconnectivity providers. For example, the capacity of access links is often lower by several orders of magnitude than the capacities of the LANs and carrier/service provider networks that they interconnect. Similarly, wireless LANs (WLANs) and wireless WANs (WWANs) have capacity restrictions and are not readily overprovisioned. In the IP network context, access links and wireless links often behave as bottleneck links, which means that often the temporal packet traffic load placed on them exceeds capacity. During such episodes, packets are queued, thereby incurring delay and loss and an associated reduction in the QoS provided to applications by the network.

When overprovisioning of network links is not feasible, then one approach to providing sufficient QoS is to limit the traffic load placed on the link. Again, because of bursty traffic processes and the behavior of conventional IP networks, however, it is difficult to enforce load limiting without adversely affecting QoS and without aggravating endpoint users. Furthermore, it is difficult economically to justify reserving large amounts of spare capacity. Accordingly, those skilled in the art often measure the efficiency of links as the ratio of the maximum allowable load to the link capacity, relative to some QoS performance metric, and commonly refer to this ratio as the density. Sometimes the density is expressed in terms of a target application, e.g., in a voice call networking environment such as that of an enterprise IP Private Branch Exchange (IP PBX), the call density measures the ratio of the maximum number of high-QoS calls supported by a link to the theoretical maximum obtained by dividing the link capacity by the required bandwidth of a call. In any case, ideally a density measure is 1, or 100%, but in practice density values of 0.2-0.5 are typical. Even with low density values, QoS guarantees are difficult to make because of the burstiness of the packet traffic processes.

Thus, convergence to IP networks has sourced a need for differentiated transport services. Providing differentiated services while maintaining required QoS performance is difficult, primarily because of the burstiness of packet traffic processes. Overprovisioning, the often-used method for supporting differentiated services and QoS, results in poor efficiency/low densities and still does not provide QoS guarantees.

A need therefore exists for methods and systems that structure and shape packet traffic such that aggregate traffic in a converged IP networking environment appear as non-bursty, near-deterministic processes to the switching infrastructure. The network could then behave as if it were switching homogeneous traffic, which is known both analytically and empirically to afford better densities and QoS performance than that afforded by heterogeneous traffic. A further need exists for methods and systems for scheduling packet service times by bottleneck links that is simple and readily implemented in existing switches and routers, as well as wireless links and wireless access networks, such as those used in 802.11 WLANs.

SUMMARY OF THE INVENTION

Generally, methods and systems are provided for scheduling one or more tasks to be performed by a resource modeled as a mathematical group. A disclosed synthetic homogenization scheduling process provides a scheduling function that incorporates features of the present invention. The disclosed synthetic homogenization scheduling process extends the methods of U.S. Pat. application Ser. No. 10/814,604, entitled "System and Method for Efficient Scheduling of Periodic Phenomena," to efficiently schedule packet transmissions by links in such a way as to emulate homogenous traffic. In an exemplary packet scheduling implementation, the disclosed synthetic homogenization scheduling process structures and shapes packet traffic, such that aggregate traffic in a converged IP networking environment appear as non-bursty, near-deterministic processes to the switching infrastructure.

According to one aspect of the invention, one or more tasks to be performed by a resource modeled as a mathematical group are scheduled by selecting a coset representative k of a subgroup of the mathematical group based on predefined criteria for homogenization of the one or more tasks. The one or more tasks may comprise, for example, packets and the resource may be, for example, one or more communications links in a packet network. The predefined criteria for homogenization of the one or more tasks includes, for example, a time-based or a size-based homogenization of the tasks (or both). A time-based homogenization of the tasks, for example, organizes tasks of different rates such that a set of scheduled flows may be partitioned into subsets such that the union of the elements in each subset is a scheduled flow of a single rate. The one or more predefined criteria can be implemented as an objective function that measures a homogeneity attribute or a density (or both) of a candidate schedule when a particular candidate coset representative is considered for a new task entering the system.

A more complete understanding of the present invention, as well as further features and advantages of the present invention, will be obtained by reference to the following detailed description and drawings.

BRIEF DESCRIPTION OF THE DRAWINGS

FIG. 2 is a flow chart illustrating an exemplary scheduling process that applies synthetic homogenization to schedule packets in an exemplary packet switching network.

DETAILED DESCRIPTION

Figure 1:
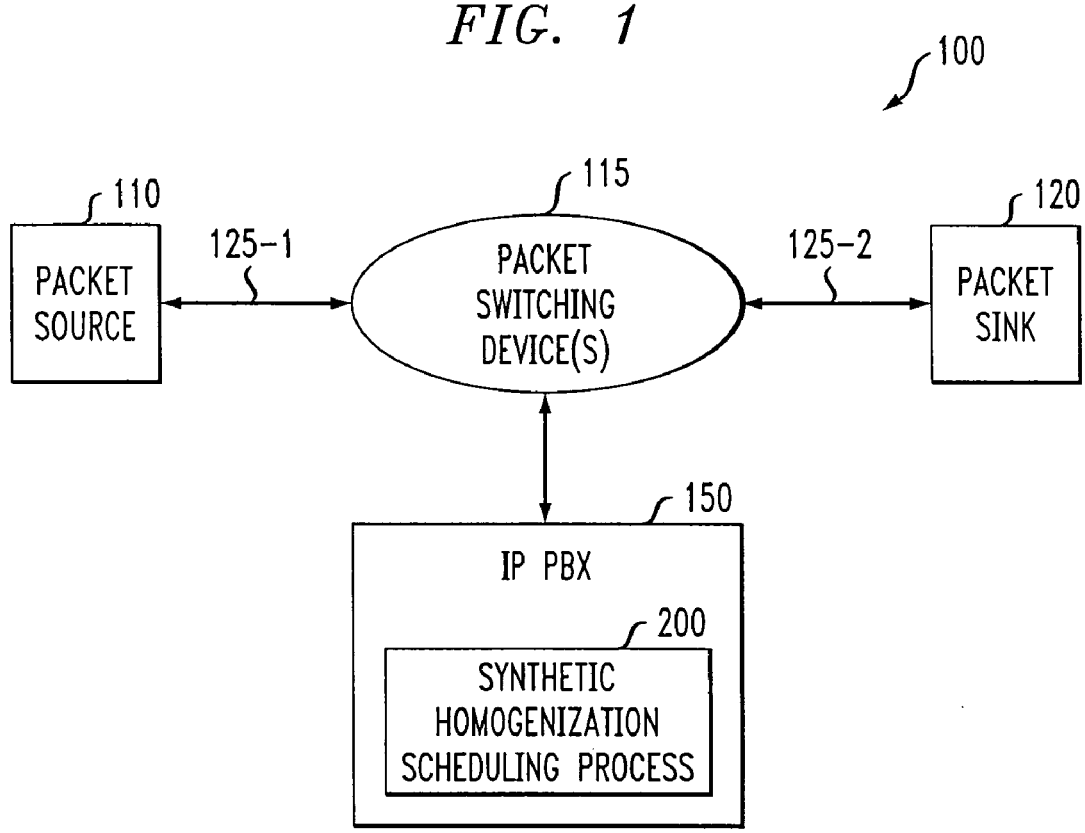
FIG. 1 is a block diagram of a packet network environment in which the present invention can operate.

The present invention provides methods and systems for scheduling resources, such as communications links, to service periodic tasks, such as communication packets in a packet-switched network. While the present invention is illustrated in the context of an exemplary packet-switched network, the scheduling techniques of the present invention may apply more generally to the scheduling of tasks for service by resources, as would be apparent to a person of ordinary skill in the art.

FIG. 1 is a block diagram of a packet network environment 100 in which the present invention can operate. As shown in FIG. 1, packet-switched networks 100 are typically composed of:

(1) host computers functioning as sources 110 and sinks 120 for packet traffic (commonly referred to as hosts, endpoints, and/or stations);

(2) host computers functioning as packet-switching devices 115 (commonly referred to as switches and/or routers); and (3) communications links 125 that interconnect the endpoints 110, 120 and switches 115, which may be physically composed of various media, such as wire cables, fiber-optic cables, or in the case of wireless links, air and space.

A synthetic homogenization scheduling process 200, discussed further below in conjunction with FIG. 2, provides a scheduling function in accordance with the present invention. As discussed hereinafter, the disclosed synthetic homogenization scheduling process 200 extends the methods of U.S. patent. application Ser. No. 10/814,604, entitled "System and Method for Efficient Scheduling of Periodic Phenomena," to efficiently schedule packet transmissions by links in such a way as to emulate homogenous traffic.

In the exemplary enterprise implementation shown in FIG. 1, the synthetic homogenization scheduling process 200 resides on an IP private branch exchange (PBX) 150, such as the Avaya Communications Manager™, commercially available from Avaya, Inc. of Basking Ridge, N.J. In further variations, the synthetic homogenization scheduling process 200 can be implemented as a network service and reside on any node or host in the network 100, as would be apparent to a person of ordinary skill in the art. The network service would serve clients, such as an IP PBX 150.

In a packet-switched, IP-based network 100 serving as transport for multiple applications, traffic is heterogeneous in the sense that individual packet flows have different throughput requirements, different packet sizes, and different inter-packet spacings (jitter) within a flow. Heterogeneous traffic causes packet-switching networks to tradeoff QoS for resource efficiency, i.e., networks either deliver good QoS performance to applications at the expense of low network resource efficiencies, or deliver high resource efficiencies at the expense of poor QoS performance. It is well-known that homogeneous traffic causes packet-switching networks to simultaneously deliver good QoS performance and high resource efficiencies; however, requiring all packet traffic sources to produce homogeneous traffic is impractical. The present invention provides a synthetic homogenization technique that structures and shapes heterogeneous traffic such that it appears to be homogeneous traffic to the packet-switching network infrastructure. Accordingly, the network simultaneously delivers improved QoS performance to applications and high network resource efficiencies.

The disclosed methods and systems structure and shape packet traffic such that the aggregate traffic in a converged IP networking environment appears as non-bursty, near-deterministic processes to the switching infrastructure. The network could then behave as if it were switching homogeneous traffic, which is known both analytically and empirically to afford better densities and QoS performance than for the case of heterogeneous traffic. Hence, the disclosed synthetic homogenization techniques of the present invention result in packet-switched converged networking environments that support high densities while simultaneously supporting good QoS performance. The method need only be applied at bottleneck links in the network, but the effects and benefits cover the entire network. The method applies a novel scheduling technique for scheduling packet service times by bottleneck links that is readily implemented in existing switches and routers, as well as wireless links and wireless access networks, such as those used in 802.11 WLANs. The method also addresses a flow-ordering dependency issue that occurs when flow requests occur in different order, or when traffic is rerouted from one link to another.

Homogeneous and Quasi-Homogeneous Traffic

In a typical converged IP network, the characteristics of individual packet flows vary considerably. Some examples include the following:

(1) A typical TCP-mediated data flow, which may be sourced by, e.g., an e-mail application sending a message with several large files attached to it, will contain packets of different sizes, and the time-spacing between consecutive packets will vary considerably because of the use of TCP's slow-start, congestion avoidance, and congestion control mechanisms, and because of dynamic properties of the underlying network, such as variations in the round-trip times between the packet sources and sinks and variations in packet dropping behavior;

(2) A flow for a telephone call using the Voice-over-IP (VOIP) protocol, which typically will have same-sized IP packets (e.g., 200 bytes for G.711-encoded, 20 ms packets) which are sent at intervals of 20 ms, thereby forming an isochronous, or periodic, packet flow. It is noted that an isochronous packet flow is characterized by packets occurring at equal intervals of time. If silence suppression is used at the source, then at the source the packet flow exhibits random-length intervals of isochronous packet flow alternating with random-length intervals of no packets, corresponding to when the end-user speaks and when the end-user is silent; and (3) A flow for a videoteleconference, which will typically send several packets per video frame, these packets being of different sizes, and forming a quasi-isochronous packet flow.

In a typical IP network, multiple flows with different values for attributes, or flow characteristics, such as packet size, packet rate, and parameters for inter-packet spacing distribution (jitter) are aggregated when traversing a network and therefore share resources. The aggregation of flows with different flow characteristics is referred to as heterogeneous traffic. It is well-known that heterogeneous traffic in an IP network results in packet traffic processes which are "bursty." Formally, a bursty process is one that exhibits long-range dependence; informally, a bursty process is one that occasionally displays arbitrarily large ratios of peak load to average load during intervals of arbitrary length. During such episodes, packet queues fill up rapidly, which increases delay, jitter, and packet discard probability for flows. Analogous behavior occurs in IEEE 802.11 wireless links using the CSMA/CA protocol for resource sharing, where sources of changes in a packet flow's characteristics include resource contention, random backoff periods, and low signal-to-noise ratios. Thus, packet flows incur distortion as they traverse the wired and wireless links in a network. A flow that is, for example, isochronous at its source may not be isochronous when it arrives at the sink, may have missing packets, and may have accumulated significant queueing delay. For many real-time inelastic applications, delay and packet loss are the major factors in degraded QoS. As noted above, overprovisioning of link capacities is one approach to mitigating the factors contributing to QoS degradation, but because of the nature of bursty traffic, there are still no QoS guarantees.

As indicated above, the flow characteristics comprise the packet size distribution, the packet rate distribution, and the inter-packet spacing distribution. The distributions may be further characterized by their first-order (expected values) and second-order (variances) statistics. When every flow in a set has at least one characteristic in which the expected value is the same and the variance value is 0 across the set (e.g., all packets are the same size), then the corresponding aggregate traffic is referred to as quasi-homogeneous traffic. When every flow in a set has for every characteristic the same expected value and a variance value of 0 across the set, then the corresponding aggregate traffic is referred to as homogeneous traffic.

It is well-known both analytically and empirically that quasi-homogeneous traffic is better-behaved than heterogeneous traffic in the sense that the factors contributing to QoS degradation are mitigated. For example, one way to measure QoS is to quantify the average queueing delay incurred by packet queues in the network. One can show that for queueing systems with a Poisson (random) arrival process, the average queueing delay for the case of same-sized packets is one-half of the average queueing delay for the case of packets of random sizes. Cell networks, such as ATM networks, by definition use packets of the same size, and it is known empirically that for a given level of QoS support, an ATM network may be operated with an average utilization rate (density) across bottleneck links that is higher than that of an IP network that switches packets of random sizes.

At the extreme, networks switching purely homogenous traffic achieve the highest densities while maintaining QoS. For example, a link in an IP network that is transporting identically encoded, low-distortion VoIP flows can support densities of 90% or greater without significant QoS degradation, as compared to a link transporting heterogeneous traffic which is typically engineered to support a density of 30-35% or less.

An obvious conclusion is that if converged IP networks transported purely homogeneous traffic, then density and QoS problems would be eliminated. But, it is not practical to enforce a policy that all applications source identical flows, which would effectively eliminate one of the major advantages of IP networking over other types of networks, such as circuit-switched TDM networks used in digital telephony. It is not even practical to enforce a policy that applications source flows that share only one flow characteristic expected value and a zero variance value and thereby create quasi-homogeneous traffic.

Instead, the present invention recognizes that one may structure and shape flows such that in aggregate, the traffic appears to be homogeneous to the network switching infrastructure. The network infrastructure will then treat the traffic as if it were homogeneous and behave as it would in a purely homogeneous traffic environment, thereby simultaneously achieving high densities and good QoS performance at bottleneck links. Hereinafter, the structuring and shaping process of the present invention is referred to as synthetic homogenization.

Synthetic Homogenization

Babylonian Scheduler

U.S. Pat. application Ser. No. 10/814,604, entitled "System and Method for Efficient Scheduling of Periodic Phenomena," filed Mar. 31, 2004, incorporated by reference herein, describes a method that models tasks (such as isochronous packet flows) and resources (such as communications links) of a scheduling system as mathematical groups, with the exemplary embodiments being finite groups of integers. The above-identified patent application is hereinafter referred to as the "Babylonian Patent Application" and the system described in the above-identified patent application is hereinafter referred to as the "Babylonian Scheduler." In an exemplary embodiment, communication links are identified with a time interval's duration, or schedule period, or cycle, during which packets will be serviced. This time interval is partitioned into a set of same-sized subintervals called appointments. An appointment interval duration A evenly divides the schedule period P, indicated as A|P. The schedule period is identified with the mathematical group $Z_N$, where N is the order of the group and where N=P|A. By inference, the communication link and the more general system resource are also identified with $Z_N$.

Packet flows are identified with the subgroups of $Z_N$, and by inference these flows must be isochronous. For any integer I such that I|N, there exists a subgroup of $Z_N$ denoted <I>. The integers I that evenly divide N are identified with the set of possible rates for the isochronous flows. The integers J=N|I are identified with the set of possible inter-packet spacings for the isochronous flows. A scheduled packet flow with packets of size one appointment is identified with a coset $<J>_k$, where k is the coset representative and is identified with the offset in the schedule for the flow, i.e., the first packet of the flow $<J>_k$ in the schedule is serviced during appointment k. Hence, the packets of flow $<J>_k$ are serviced during the set of appointments {k, k+J, k+2J, . . . }. A scheduled packet flow with packets of size v >1 is identified with the set of cosets $\{<J>_k, <J>_{k+1}, \ldots <J>_{k+v-1}\}$, i.e., with a set of v contiguous cosets. Scheduled flows with packets larger than one appointment are represented as the union of adjacent cosets. Note that a packet flow with an inter-packet spacing of J has a packet rate I=N|J, i.e., the flow has a rate of I packets per cycle.

The Babylonian Patent Application further describes group- and number-theoretic methods for selecting values of appointment size A, schedule period P, group order N, and for selecting subsets of the possible rates for isochronous flows in such a way as to afford efficient algorithms for contention-free scheduling of packet flows for service by communications links.

Synthetic homogenization extends the methods of the Babylonian Patent Application to efficiently schedule packet transmissions by links in such a way as to emulate homogenous traffic. Synthetic homogenization is embodied in the logic and objectives of the resource (link) scheduling algorithm that is part of the scheduling system. In the packet-switching context, synthetic homogenization has at least two domains from which it derives homogeneity objectives:

(1) a time, or equivalently a frequency, domain; and (2) a size, or logical mass, domain.

When a scheduling algorithm uses objectives from the time/frequency domain, one says that it is performing rate homogenization; when a scheduling algorithm uses objectives from the size/mass domain, one says that the scheduling algorithm is performing packet size homogenization.

Rate Homogenization

Rate homogenization uses a strategy that organizes packet flows of different rates such that a set of scheduled flows may be partitioned into subsets such that the union of the elements in each subset is a scheduled flow of a single (homogeneous) rate. For example, suppose that for a packet scheduling system with a link $Z_{60}$, the single homogeneous rate is selected to be 6 packets per cycle, or flows represented as the subgroup <10>. Without loss of generality, assume that the packet size is one appointment. Now suppose that there are two flows requiring a throughput of 3 packets per cycle, represented as <20>. A scheduling algorithm may schedule these two flows as the cosets $<20>_0$ and $<20>_{10}$ respectively. The union of the two scheduled flows $<20>_0$ and $<20>_1$ is the coset $<10>_0$, which is a single scheduled flow of the homogenous rate. The underlying link/switching infrastructure services the two <20> flows in precisely the same way that it services a single <10> flow. As a result of the rate homogenization strategy, the link behaves as if it were servicing rate-homogeneous traffic.

Note that if a flow has a rate higher than the homogenous rate, techniques based on the decomposition method described in the Babylonian Patent Application may be used to synthesize flows of the homogeneous rate, as is readily apparent to those skilled in the art.

A general method for synthetic rate homogenization is described as follows. Given a link $Z_N$, a homogeneous rate value I and corresponding task (packet) spacing interval J =N|I, a set of rate values R permitted by the system configuration with said rate values in R being even divisors of N and which includes the rate value 1, and the subset $R_I$ of R containing those elements in R that are less than or equal to I and that evenly divide I. For each element r in $R_I$, corresponding to a flow <S> where S=N|r, a scheduled flow $<J>_k$ may be synthesized from I|r scheduled flows $<S>_k$, $<S>_{k+J}$, $<S>_{k+2J}, \ldots <S>_{k+((I/r)-1)J}$. Note that any component scheduled flow $<S>_m$ may itself be synthesized using the same method in a recursive fashion.

For the case where a flow has a rate value Q larger than the homogeneous rate value I, the flow may be decomposed into a set of subflows with rates restricted to the values in $R_I$, and then the synthetic homogenization method may be applied to the set of subflows to synthesize flows with the homogeneous rate. It may be the case that I does not evenly divide Q, in which case there will be some subflows which are not mapped into a homogeneous flow. There are several methods for handling this case, as is readily apparent to one skilled in the art. One straightforward method is to schedule one additional flow at the homogeneous rate and populate it with the remaining subflows, but there will be some scheduled appointments that will not have packets to service.

The Babylonian Patent Application describes a method for choosing a set of rates, or equivalently a set of inter-packet spacings, that affords isochronicity as well as efficient and flexible service scheduling of packet flows for a given $Z_N$. In practice N, needs to be chosen such that the rates necessary to support throughput requirements by applications that the network will service map to even divisors of N. For example, a typical VoIP endpoint using the G.711 encoding and a 20 ms packetization sources an isochronous packet stream with an inter-packet spacing of 20 ms. To support this application, link schedule periods should be an integer multiple of 20 ms. If a link schedule period is configured to be, e.g., 120 ms, then the isochronous packet flow rate for the VoIP-based application is 6 packets per schedule period.

Thus, when configuring the value of N that identifies the link schedule period with the group $Z_N$, in order to support the VoIP application, N must be evenly divisible by 6. In a converged environment, there will be multiple applications with different throughput and packet size requirements, which translates to different packet rates and therefore different values by which N must be evenly divisible. When appointment size criteria are also factored in, as well as the different capacities of the links to which scheduling will be applied, then configured values for N tend to be highly composite numbers, i.e., they will support a large number of rates. It is also the case that in practice, configured values of N result in isochronous rates that are incompatible with each other in the sense that if a flow of one of these rates is scheduled for service, then it is impossible to schedule another flow for service of an incompatible rate without violating the isochronicity requirement, as is described in the Babylonian Patent Application. For example, if N=30, then isochronous flow rates of 10 and 6 packets per period, or equivalently the subgroups <3> and <5>, can be supported. However, if for example <3> is scheduled as $<3>_j$, then there does not exist a coset representative k such that the scheduled flow $<5>_k$ will not "collide" with $<3>_j$.

The Babylonian Patent Application further describes a method based on the Perfect Packing Corollary that identifies the sets of isochronous rates that may be jointly scheduled without necessarily colliding. The effect is to restrict a set of all possible isochronous rates for a given value of N to a smaller set of rates to afford more efficient, collision-free scheduling. Such a set of rates with element selection based on the Perfect Packing Corollary is called a reduced set.

When using synthetic homogenization methodology while scheduling flows, additional computational efficiencies may be obtained by further restricting the reduced set of supported rates to a divisible set, defined as follows: A divisible set D is one in which for any and all pairs of elements a,b in D, a|b whenever a<b. For example, {1,3,6} is a divisible set, but {1,2,3,6} is not a divisible set because 2 does not evenly divide 3. The computational efficiency results from a reduction in the logic required to implement the general method for synthetic rate homogenization described above. In particular, restriction to a divisible set reduces the number of possible combinations of flow rates that may be used in the construction of a synthetically homogenized flow, and it increases the probability that a set of flows with arbitrary rates that are smaller than the homogenous rate can be partitioned such that the union of the sets in the partition approaches or equals the maximum possible number of homogeneous flows. Stated in pragmatic terms, use of divisible sets of flow rates simplifies rate homogenization logic, which results in improved scheduler efficiency and performance.

Note that in practice, it may be useful to select a quasi-divisible set of supported rates for use in the synthetic homogenization logic in order to meet application throughput and packet size requirements. A quasi-divisible set is one that may not be divisible but that may be formed from the union of a relatively small number, e.g., two, of maximally-sized divisible subsets. For example, the set {1,2,3,6} is not divisible, but it is quasi-divisible because it may be formed from the union of the maximally-sized subsets {1,2,6} and {1,3,6}. A maximally-size divisible subset is a subset in which for any element a in the subset, every element in the parent set that is evenly divisible by a is also in the subset. The number of maximally-divisible subsets for a given subset corresponds to the number of pairs of elements in the set that are relatively prime. Thus, stated another way, a divisible set contains elements which are not relatively prime, and a quasi-divisible set contains only a few elements which are pairwise relatively prime.

Packet Size Homogenization

Packet homogenization is similar to rate homogenization, but where rate homogenization is applied in logical time/frequency domains, packet homogenization is applied in a logical mass, or size, domain, which when specialized to packets may use a unit of measure based on the byte. For example, for a system with a link $Z_{60}$, suppose the homogeneous packet size is selected to be four units, i.e., four appointments. Suppose that two flows <20>, each with packets of size two appointments, need to be scheduled for service. A scheduling algorithm that performs packet size homogenization may schedule the two flows as $\{<20>_0, <20>_1\}$ and $\{<20>_2, <20>_3\}$. The union of the two scheduled flows is $\{<20>_0, <20>_1, <20>_2, <20>_3\}$, which is equivalent to a <20> flow with packets measuring four appointments, the homogenous packet size. The underlying link/switching infrastructure thus services the two <20> flows with packets of size two appointments in precisely the same way that it services a single <20> flow with packets of size four appointments. As a result of the packet size homogenization strategy, the infrastructure behaves as if it were servicing packet-size-homogeneous traffic.

For reasons similar to those of rate homogenization (namely, simplified logic and reduced computation resources), packet size homogenization benefits from the use of divisible or quasi-divisible sets of supported packet size values. In general, restricting the set of supported values used in any domain's homogenization process to divisible or quasi-divisible sets affords benefit with respect to simplified logic and computation resources.

Note that in practice, packet homogenization incurs a form of discretization error, and reducing the discretization error may be used as a criterion in selecting sets of supported values used by the homogenization process as well as in selecting appointment size. In the packet-switching context, the appointment size is typically defined as a number of bytes, and for practical reasons, the appointment size will be larger than 1 byte. For example, a typical value used by those skilled in the art is 50 bytes. Thus, when measuring packets in units of appointments, there will often be a discretization error in that whenever a packet size is not an integer multiple of the appointment size, the measurement result in units of appointments is always rounded up to the nearest integer. For example, a packet of size 576 bytes measures 12 appointments when the appointment size is configured to be 50 bytes, and the discretization error is 24 bytes ((12*50)−576 =24).

If information about the distribution of packet sizes in units of bytes is available, then one can select an appointment size that will minimize or reduce the expected discretization error. In general, knowledge of the distribution of the measures of tasks within a domain may be used to select the scheduling system's unit of measure (appointment size) in such a way as to reduce or minimize discretization errors. Any of a variety of minimization techniques well-known to those of ordinary skill in the art may be used to select a unit of measure (appointment size) that reduces expected discretization errors. Minimizing discretization errors is important because discretization errors translate to inefficient usage of scheduled resources. For example, in the packet switching context, in the example used above with a 576-byte packet and a 50-byte appointment size, a scheduler using the appointment size as a unit of measure will assign a time t when a link will begin servicing the packet. Because scheduler logic uses the appointment size (50 bytes) as the unit of measure, the next time in the schedule that the scheduler is able to assign the link to service a packet is at time t+12 appointments, which means that the link will be idle for 24 bytes worth of time.

Measurement of Homogeneity and Density Using Objective Functions

A scheduler using a synthetic homogenization strategy in accordance with the present invention may use one or more domain homogenization strategies as well as strategies for maximizing density. The scheduler's goal is to find an available coset representative k for a flow <J> such that the homogeneity and the density of the set of flows traversing the associated link are maximized. This implies that selection of the best coset representative k from the set of available coset representatives is determined by an objective, or scoring, function that measures homogeneity and density of a candidate link schedule when a particular candidate coset representative is considered for a new flow entering the system. Note that there may not be an available coset representative k, i.e., that there is insufficient capacity in the schedule to service the flow according to the flow requirements, in which case the scheduler does not satisfy the request and notifies the requestor of the condition.

The objective function may be formed from a combination of homogeneity and density measurements, or subfunctions, as well as any other relevant schedule performance measurements, and may weight the individual subfunctions differently in order to bias the scheduler towards selecting a coset representative and associated link schedule that best meets system objectives. For example, a typical objective function often used in practice is a linear combination of weighted subfunctions, such as $$F(x) = W_0 F_0(x) + W_1 F_1(x) + \ldots W_n F_n(x) \qquad (1)$$

where x represents the schedule, where the $F_i(x)$ subfunctions are applied to the schedule x, measure some schedule property (e.g., rate homogenization, or packet-size homogenization), and return numeric values, and where the weights $W_i$ are numeric values that may take on different values such that F(x) reflects a bias towards some subfunctions over others. In general, an objective function may be composed of arbitrarily many subfunctions, with each subfunction measuring various schedule properties and having a weighting or bias factor applied to it, in order that the scheduler may produce possibly different schedules for the same set of flows traversing a link. As is well-known to those of ordinary skill in the art, methods for combining and weighting subfunctions of an objective function may take many forms besides the linear combination form used in Eq. (1) above, and any of these may be used in an implementation of the present invention.

As an example of the use of subfunctions and weighting factors, consider a scheduler operating over $Z_{60}$ that performs both rate and packet-size homogenization, with the homogeneous rate configured to be 6 packets per cycle, or <10>, and the homogeneous packet size to be two appointments. Suppose there is a scheduled flow $<20>_0$ currently being serviced by the link, and a new flow <20> with packets of size one appointment arrives into the system and needs to be scheduled. Suppose that the coset representatives 1 and 10 are both available. Scheduling the <20> flow as $<20>_1$ achieves packet size homogenization but not rate homogenization. Likewise, scheduling the <20> flow as $<20>_{10}$ achieves rate homogenization but not packet homogenization. If the objective function is biased more heavily towards rate homogenization than packet size homogenization, then the scheduler will select coset representative 10; if the objective function is biased more heavily towards packet size homogenization than rate homogenization, then the scheduler will select coset representative 1.

Schedule Fragmentation

Another important scheduling strategy for achieving high density is to select coset representatives that minimize schedule fragmentation. In general, it is not desirable to fragment packets, even though it is allowed by router/switch systems compliant with IP Version 4. Hence, when selecting a coset representative for a flow, it is desirable to choose a coset representative that maximizes the size of blocks of contiguous available cosets, or equivalently that minimizes schedule fragmentation. For example, suppose that for $Z_{60}$ configured with a homogenous rate of 6 packets per cycle (<10>) and a homogeneous packet size of 1, there is one scheduled flow $<10>_0$ in the system. A new <10> flow with packet size of one appointment arrives and needs to be scheduled. The available coset representatives are the integers 1 through 9. If the objective function is composed only of subfunctions that only measure rate homogenization and packet size homogenization, then the objective function score of each potential schedule is the same for each available coset representative, regardless of the weighting factors/biases applied to the subfunctions of the objective function.

Suppose that the system selects coset representative 5 and schedules the flow as $<10>_5$. An examination of the union of $<10>_0$ and $<10>_5$, or {0, 5, 10, 15, . . . 55}, shows that the largest contiguous block of available cosets is of size 4. This means that any flow with packet size greater than 4 cannot be scheduled, unless the packets are fragmented, even though 80% of the link capacity is available and a flow <10> with packets of size 4 appointments requires only 40% of the link capacity. If instead the scheduler objective function also has a subfunction that measures fragmentation (and the subfunction weighting is non-zero), then coset representatives 1 and 9 will maximize the overall objective function score, as the resultant schedule will have contiguous blocks of available cosets of size 8 appointments, i.e., a flow with packets of size 8 appointments may be scheduled (which in this example results in a density of 100%).

Maintaining Aggregation Throughout Network

In the packet-switching context, yet another subfunction may be included as part of the overall objective function in order to bias link schedules toward achieving a global goal of ensuring homogeneous traffic everywhere in the network, as follows: different flows in an IP network may traverse different paths (sets of communication links) through the network depending on the destination address and the routing state of the switching infrastructure. Thus, two (or more) flows that are aggregated into a homogenous flow at one link may be disaggregated at some downstream communications link because the destinations of the two flows are different, which may be considered undesirable. Hence, if there is a subfunction that measures downstream (dis)aggregation, then local link schedules may be produced that are biased towards maintaining aggregation and therefore a greater degree of homogeneity throughout the network. In this case, destination address (in practice, one would probably use the subnet address) similarity between scheduled flows and flows to be scheduled may be used as a criterion for selection of coset representatives. In a conventional IP WAN network, a synthetically homogenized flow composed of two flows with the same destination subnet address is likely not to be disaggregated during traversal of the WAN. This additional subfunction measures some path similarity metric, which may take a variety of forms, as is readily apparent to those of ordinary skill in the art.

Order-Independent Scheduling

Synthetic homogenization also solves an order-dependence problem that arises when different applications issue requests for services in arbitrary order, and depending on the order of the requests, said requests may or may not be satisfied. This same order dependence phenomenon may also be problematic in environments where the flows traversing a given link are re-routed to another link. Rerouting may occur for several reasons, including a routing update, a link failure in a system with a failover mechanism, or the use of path optimization in a network. A typical path optimization deployment occurs in an enterprise network in which LANs or other subnets are "multi-homed," i.e., the enterprise contracts with multiple service providers for WAN interconnectivity, and hence there are multiple access links connecting a given subnet to the WAN. At a given subnet, a path optimization system continually monitors the performance of each service provider network and routes traffic over the access link connected to the service provider network that currently provides the best service. In these rerouting scenarios, the flows scheduled across a link may need to be efficiently rescheduled, and order dependence may result in unsatisfactory results where density was high before the re-route but lower after the re-route, behavior that is considered unacceptable.

In the absence of a synthetic homogenization strategy, it is possible, even highly probable, for situations to arise in which a reschedule fails to efficiently schedule the flows onto a different link because the order in which the flows were originally scheduled on the original link is unknown to the rescheduling algorithm. In such cases, there is said to be an order dependency problem. Consider a T1 (1.536 Mbps) access link, a link scheduling system with 120 ms schedule period, and a 50-byte appointment size. Although the schedule period and appointment size yield a maximum of N=460 appointments per schedule period, selecting N=456 instead produces a set of possible isochronous flow rates that is better suited for the intended applications (and note that N=456 affords an actual appointment size of 50.5263 bytes, which affords a small buffer to account for and conceal microjitter). The requirement is to be able to service a 5-channel VoIP trunk with G.711-encoded, 20 ms packets, a 384 Kbps IP video teleconference, and at least three Ethernet-MTU-sized packets (31 appointments) from non-real-time applications during every schedule period. Each VoIP channel must be an isochronous flow at 6 packets per schedule period in order to meet a zero jitter requirement, with packets of size 5 appointments. The 384 Kbps IP videoconference produces packets of size 5 appointments and at a throughput rate of 36 packets per schedule period. Packet fragmentation is not allowed.

Note first that the requirement to service at least three MTU-sized packets each schedule period, as well as the value of N, precludes that the IP videoconference flow be isochronous at 36 packets per cycle. To support this isochronous rate, N would need to be changed to 432, and the corresponding inter-packet spacing would be 12 appointments, which means that there is insufficient available space in the schedule to service a 31-appointment, MTU-sized packet. An a priori analysis by one of ordinary skill in the art shows that the 384 Kbps, 30 packets-per-period IP videoconference flow should be decomposed into 12 subflows of 3 packets-per-period, according to the decomposition method described in the Babylonian Patent Application.

Now suppose a schedule is created using an objective function with a single objective of minimizing schedule fragmentation and without any homogenization objective. First, the scheduler allocates sufficient space to satisfy the MTU-sized packets, which results in the scheduled flow $\{<152>_0, <152>_1, \ldots <152>_{30}\}$ which hereinafter will be abbreviated as $\{<152>_{0-30}\}$. Second, the request for the 5-channel VoIP trunk arrives, which the scheduler schedules in the following order: $\{<76>_{31-35}, <76>_{36-40}, <76>_{41-45}, <76>_{46-50}, <76>_{51-55}\}$. Third, the request for the 384 Kbps IP videoconference arrives, which the scheduler schedules in the following order: $\{<152>_{56-60}, <152>_{61-65}, <152>_{66-70}, <152>_{71-75}, <152>_{76-80}, <152>_{81-85}, <152>_{86-90}, <152>_{91-95}, <152>_{96-100}, <152>_{101-105}, <152>_{132-136}, <152>_{137-141}\}$. Thus, all requests are satisfied, QoS is maximized in that jitter is minimized and the schedule is contention-free, i.e., there are never any packets contending for the link resource at the same time, and the schedule efficiency is 423/456 =92.8%. Also, because fragmentation minimization was the only objective, space remains for a 3 packets-per-period flow with packets as large as 10 appointments (500 bytes), which could be scheduled as $<152>_{142-15l}$ (and achieve a density of 100%).

Now suppose instead that after scheduling the space for the MTU-sized packets as above, the next request is to schedule the IP videoconference before the 5-channel VoIP trunk. With an objective function that only minimizes schedule fragmentation, the IP videoconference subflows are scheduled in the order $\{<152>_{31-35}, <152>_{36-40}, <152>_{41-45}, <152>_{46-50}, <152>_{51-55}, <152>_{56-60}, <152>_{61-65}, <152>_{66-70}, <152>_{71-75}, <152>_{76-80}, <152>_{81-85}, <152>_{86-90}\}$. A subsequent request to schedule the 5-channel VoIP trunk while meeting the zero jitter requirement, i.e., that the <76> flows are isochronous, cannot be satisfied. In fact, not even a single channel of the VoIP trunk can be scheduled if the zero-jitter requirement is to be met, as a <76> flow must have its coset representatives in the set {0,1, . . . 75}, all of which have already been assigned to the MTU-packet flow and the IP videoconference subflows. Thus, there is an order-dependency problem, resulting in a poor schedule efficiency value of (3*91)/456 =59.9%.

As noted above, a homogenization strategy mitigates or even eliminates order dependency problems. Suppose in the example above, a rate homogenization subfunction (with a non-zero weighting factor) is added to the objective function, and the homogeneous rate is configured to be 6 packets per period, or equivalently <76>. As before, the MTU-size packet flow is scheduled first as $<152>_{0-30}$, and also as before the 5-channel VoIP trunk is scheduled next as $\{<76>_{31-35}, <76>_{36-40}, <76>_{41-45}, <76>_{46-50}, <76>_{51-55}\}$. Third, the IP videoconference is scheduled, and because of the rate homogenization objective, the scheduler will first create synthetically homogenized <76> flows by scheduling the video <152> subflows such that the union of the scheduled video <152> flows and the $<152>_{0-30}$ MTU-sized maps to a set of homogeneous <76> flows. Hence, six of the 12 video <152> flows are scheduled in the following order: $\{<152>_{76-80}, <152>_{81-85}, <152>_{86-90}, <152>_{91-95}, <152>_{96-100}, <152>_{101-105}\}$. The remaining six video <152> flows are then scheduled in the order $\{<152>_{56-60}, <152>_{132-136}, <152>_{61-65}, <152>_{137-141}, <152>_{66-70}, <152>_{142-146}\}$, which synthesizes three <76> flows, namely $<76>_{56-60}, <76>_{61-65}$, and $<76>_{66-70}$. As before, when only a fragmentation minimization objective was applied, the scheduling of the application flows in the given order of the MTU-sized packet flow, the VoIP trunk, and the IP videoconference results in a dense schedule.

If the order of the scheduling of the application flows is changed to the MTU-sized packet flow, the IP videoconference, and lastly the VoIP trunk, then whereas with only a fragmentation minimization objective, the flows could not be scheduled, while with a rate homogenization objective the flows can be scheduled (i.e., the order does not affect the density). As always, the MTU-sized flow is scheduled as $<152>_{0-30}$. Next, the IP videoconference subflows are scheduled to homogenize the $<152>_{0-30}$ flow, resulting in the six scheduled flows $\{<152>_{76-80}, <152>_{81-85}, <152>_{86-90}, <152>_{91-95}, <152>_{96-100}, <152>_{101-105}\}$. The remaining six subflows are scheduled as $\{<152>_{31-35}, <152>_{107-111}\}$ to synthesize the homogeneous flow $<76>_{31-35}$, and as $\{<152>_{36-40}, <152>_{112-116}\}$ to synthesize the homogeneous flow $<76>_{36-40}$. Lastly, the 5-channel VoIP trunk is scheduled as $\{<76>_{41-45}, <76>_{46-50}, <76>_{51-55}, <76>_{56-60}, <76>_{61-65}\}$. Thus, using a rate homogenization objective affords scheduling of all the applications flows regardless of the order of the VoIP trunk and IP videoconference requests.

Using homogenization objectives may mitigate or eliminate order dependencies related to setup and teardown processes of applications flows, as described in the following example. Suppose that the requirements in the previous example are modified such that at any time, the system needs to support the MTU-sized $<152>$ flow and either two 384 Kbps IP videoconference flows, or two 4-channel VoIP trunks, or one 384 Kbps IP videoconference and one 4-channel VoIP trunk, regardless of the arrival (i.e., setup) order of the requests and the departure (i.e., teardown) order of the flows. Similar to the explicit example above, one can show that use of an objective function with both fragmentation minimization and rate homogenization objectives always results in a dense schedule regardless of the order of setups and teardowns.

Deployment

A typical modem enterprise WAN is often constructed as follows. Access subnets in the form of wired LANs (e.g., 10/100 or 1G Ethernet) or wireless LANs (e.g., 802.11a/b/g/e) connect endpoint hosts to a high-capacity distribution network to form a logical site. Smaller offices and satellite offices often will not have a distribution network, but are also considered to be logical sites. Sites are typically geographically dispersed across a wide geographic area. Sites are interconnected to form the enterprise WAN either by private lines and/or by lines leased from a third-party provider and/or by networks owned by third-party service providers. For reasons of cost and availability, these WAN interconnections are typically of much lower capacity than the LAN, distribution, and service provider networks they may interconnect, and as such behave as bottleneck links. For a variety of physical reasons, such as interference, low signal-to-noise ratios, and the use of CSMA/CA protocols for air link resource sharing, WLANs may also function as bottleneck links in the WAN.

Bottleneck links often become congested because the temporal load exceeds the capacity. During such episodes, packets are queued and may incur significant queueing delay or may be dropped, and the flows with which they are associated becomes distorted in the sense that the inter-packet spacings have changed significantly from the inter-packet spacings sourced by the applications. On the other hand, high-capacity LANs and the core of service provider networks are usually composed of high-capacity links, which often do not contribute significantly to distortion. Under these assumptions, applying synthetic homogenization only at bottleneck links should be nearly as effective as applying synthetic homogenization at all links in a network with respect to having the entire network behave as if it were transporting homogeneous traffic everywhere and thereby incurring the concomitant QoS and density benefits.

FIG. 2 is a flow chart illustrating an exemplary implementation of a scheduling process 200 that applies synthetic homogenization to packet flows, for example, at a bottleneck link in a packet switching network. As shown in FIG. 2, a link scheduler system, such as the Babylonian Scheduler, is initially configured during step 210 for the system unit of measure (appointment size), a schedule period, and an associated value of N that specifies the order of the underlying mathematical group.

During step 220, sets of divisible or quasi-divisible rates and packet sizes are identified and configure the rates and packet sizes supported by the scheduling system. The homogeneous rate, homogenous packet size, and any other homogeneity parameter values are assigned, as well as any values for scheduler objective function parameters, such as weighting factors.

A request for the link to service a flow $<J>$ is received during step 230, which the scheduler attempts to satisfy by searching for and finding an available coset representative k that maximizes an objective function. The objective function is composed of homogenization objectives and possibly other objectives such as schedule fragmentation minimization, as discussed above.

A test is performed during step 240 to determine if an available coset representative k, is found. If it is determined during step 240 that there is no available coset representative k, i.e., the scheduler cannot find space in the current schedule to accommodate the $<J>$ flow requirements, then in step 250 the process 200 notifies the requesting agent of the condition and returns to step 230 where the system waits for the next request.

If, however, it is determined during step 240 that an available coset representative k is found that maximizes the objective function, then in step 260 the link services the scheduled flow $<J>_k$, during appointments k, k+J, k+2J . . . k+((N|J)−1)*J) until the packet source pool is empty, i.e., the application sourcing the packets halts. For example, if the application is an IP telephony phone call, the associated packet flow source halts when the participants hang up. When the packet flow source halts, the appointments used by $<J>_k$ are returned to the resource pool during step 270 and therefore may be used to schedule another flow. After initiating the servicing of $<J>_k$, the system returns to step 230 where it waits for the next request.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
   determining, by a scheduler in a network, an appointment size A, a period P, and an associated value of N=P/A, for a mathematical group $Z_N$ that represents a resource in the network;
   assigning, by the scheduler to the resource, a homogeneous rate I for a first flow <J1> that comprises a plurality of tasks of different rates that are to be performed by the resource, wherein J1=N/I;
   selecting, by the scheduler, a coset representative k of a first subgroup of the mathematical group $Z_N$, wherein the selecting is based on a first rate R1 of a second flow <J2>$_k$ that comprises a first subset of the plurality of tasks, and wherein J2=N/R1;
   scheduling by the scheduler, the flow <J2>$_k$ to be serviced by the resource during appointments k, k+J2, k+2*J2 . . . k+((N/J2)-1)*J2);
   selecting, by the scheduler, a coset representative j of a second subgroup of the mathematical group $Z_N$, wherein the selecting is based on a second rate R2 of a third flow <J3>$_j$ that comprises a second subset of the plurality of tasks, and wherein J3=N/R2; and
   scheduling, by the scheduler, the flow <J3>$_j$ to be serviced by the resource during appointments j, j+J3, j+2*J3 . . . j+((N/J3)-1)*J3);
   wherein the flow <J1> is synthesized by the union of flow <J2>$_k$ and flow <J3>$_j$, and wherein the resource performs at the homogeneous rate I.

2. The method of claim 1, wherein a task is represented by a coset and an associated subgroup.

3. The method of claim 1, wherein the tasks in the plurality of tasks comprise packets, and the resource is a communications link in the network.

4. The method of claim 1,
   further comprising:
   when the first rate R1 is greater than the homogeneous rate I, decomposing the flow <J2> into subflows that are consistent with the homogeneous rate I.

5. The method of claim 1, wherein the selecting of the first coset representative k is further based on a size-based homogenization of the first subset of tasks.

6. The method of claim 5, wherein the size-based homogenization is further based on a reduction of discretization error.

7. The method of claim 1, wherein the resource is a communication link, and the plurality of tasks are packet flows.

8. The method of claim 1, wherein a reduced set of supported rates is restricted to a divisible or quasi-divisible set.

9. The method of claim 1, wherein the selecting of the first coset representative k is further based on maximizing a density of the plurality of tasks relative to the resource.

10. The method of claim 1, wherein an objective function measures a homogeneity attribute of a candidate schedule when a particular candidate coset representative is considered for a new task that requires the resource.

11. The method of claim 1, wherein an objective function measures a density of a candidate schedule when a particular candidate coset representative is considered for a new task that requires the resource.

12. The method of claim 10, wherein the objective function includes a plurality of homogeneity and density measurements.

13. The method of claim 10, wherein the objective function includes a plurality of weightings for a plurality of homogeneity and density measurements.

14. The method of claim 1, wherein the selecting of the first coset representative k is further based on reducing a schedule fragmentation.

15. The method of claim 1, wherein the selecting of the first coset representative k is further based on a measure of downstream disaggregation of the plurality of tasks.

16. A system comprising:
    a memory that is tangible and non-volatile; and
    at least one processor, coupled to the memory, operative to:
    determining, by a scheduler in a network, an appointment size A, a period P, and an associated value of N=P/A, for a mathematical group $Z_N$ that represents a resource in the network, wherein the resource is to perform a plurality of tasks;
    synthesizing, by the scheduler, the plurality of tasks into a scheduled flow <J>$_k$ that has a homogeneous rate value I and a corresponding inter-task spacing interval J=N/I, based on selecting a coset representative k of a subgroup of the mathematical group $Z_N$, wherein:
    a set of rate values R, with the rate values in R being even divisors of N, including the rate value 1, and the subset $R_I$ of R containing those elements in R that are less than or equal to I and that evenly divide I, and wherein for each element r in $R_I$, corresponding to a flow <s> where s=N/r, the scheduled flow <J>$_k$ is synthesized from I/r flows <s>$_k$, <s>$_{k+J}$, <s>$_{k+2*J}$, . . . <s>$_{k+((I/r)-1)*J}$;
    wherein the resource performs at the homogeneous rate I.

17. The system of claim 16, wherein a task is represented by a coset and an associated subgroup.

18. The system of claim 16, wherein the tasks in the plurality of tasks comprise packets, and the resource is a communications link in a packet network.

19. The system of claim 16, further comprising:
    when a flow has a rate value Q that is larger than the homogenous rate value I, decomposing the flow into a set of subflows with rates restricted to the values in $R_I$; and
    recursively synthesizing the flow based on the homogeneous rate value I.

20. The system of claim 16, wherein the selecting of the coset representative k is further based on a size-based homogenization of the plurality of tasks.

21. The system of claim 16, further comprising:
    restricting the values in R to a divisible set D, wherein for any and all pairs of elements a and b in D, a evenly divides b whenever a<b.

22. The system of claim 16, further comprising:
    maximizing a density of the plurality of tasks relative to the resource.

23. The system of claim 16, wherein an objective function measures a homogeneity attribute of a candidate schedule when a particular candidate coset representative is considered for a new task that requires the resource.

24. The system of claim 16, wherein an objective function measures a density of a candidate schedule when a particular candidate coset representative is considered for a new task that requires the resource.

25. The system of claim 23, wherein the objective function includes a plurality of homogeneity and density measurements.

26. The system of claim 23, wherein the objective function includes a plurality of weightings for a plurality of homogeneity and density measurements.

27. A method comprising:
  determining, by a scheduler in a network, an appointment size A, a period P, and an associated value of N=P/A, for a mathematical group $Z_N$ that represents a resource in the network, wherein the resource is to perform a plurality of tasks;
  synthesizing, by the scheduler, the plurality of tasks into a scheduled flow $<J>_k$ that has a homogeneous rate value I and a corresponding inter-task spacing interval J=N/I, based on selecting a coset representative k of a subgroup of the mathematical group $Z_N$ wherein:
  a set of rate values R, with the rate values in R being even divisors of N, including the rate value 1, and the subset $R_I$ of R containing those elements in R that are less than or equal to I and that evenly divide I, and wherein for each element r in $R_I$, corresponding to a flow $<s>$ where s=N/r, the scheduled flow $<J>_k$ is synthesized from I/r flows $<s>_k$, $<s>_{k+J}$, $<s>_{k+2*J}$, ... $<s>_{k+((I/r)-1)*J}$;
  wherein the resource performs at the homogeneous rate I.

28. The method of claim 27, wherein the selecting of the coset representative k is also based on a size-based homogenization of the plurality of tasks.

29. The method of claim 28, wherein the size-based homogenization is further based on a reduction of discretization error.

30. The method of claim 27, wherein further comprising:
  when a flow has a rate value Q that is larger than the homogenous rate value I, decomposing the flow into a set of subflows with rates restricted to the values in $R_I$; and
  recursively synthesizing the flow based on the homogeneous rate value I.

31. The method of claim 27, further comprising:
  restricting the values in R to a divisible set D, wherein for any and all pairs of elements a and b in D, a evenly divides b whenever a<b.

32. The method of claim 27, further comprising:
  restricting the values in R to a quasi-divisible set F, wherein the elements of F are formed from the union of at least one divisible subset D, wherein for any and all pairs of elements a and b in D, a evenly divides b whenever a<b.

33. The method of claim 27, wherein an objective function measures a homogeneity attribute of a candidate schedule when a particular candidate coset representative is considered for a new flow that requires the resource.

34. The method of claim 27, wherein an objective function measures a density of a candidate flow schedule when a particular candidate coset representative is considered for a new flow that requires the resource.

35. The method of claim 33, wherein the objective function includes a plurality of homogeneity and density measurements.

36. The method of claim 33, wherein the objective function includes a plurality of weightings for plurality of homogeneity and density measurements.

* * * * *